United States Patent
Best et al.

(10) Patent No.: US 8,276,943 B2
(45) Date of Patent: Oct. 2, 2012

(54) SYSTEMS AND METHODS FOR POLE IMPACT FORCE DAMPING

(75) Inventors: Christopher Best, Park City, UT (US); David Mellon, Park City, UT (US); Ben Walker, Draper, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 836 days.

(21) Appl. No.: 11/938,598

(22) Filed: Nov. 12, 2007

(65) Prior Publication Data
US 2008/0116682 A1 May 22, 2008

Related U.S. Application Data

(60) Provisional application No. 60/866,417, filed on Nov. 18, 2006.

(51) Int. Cl.
*A63C 11/22* (2006.01)
(52) U.S. Cl. ............ 280/819; 280/821; 280/823; 135/65
(58) Field of Classification Search .................. 280/809, 280/819, 821–824; 135/65, 82
See application file for complete search history.

(56) References Cited

U.S. PATENT DOCUMENTS

| | | | | | |
|---|---|---|---|---|---|
| 2,397,499 | A | * | 4/1946 | McGowan | 135/82 |
| 3,409,284 | A | * | 11/1968 | Johannes | 267/153 |
| 3,797,845 | A | * | 3/1974 | Kepka et al. | 280/822 |
| 4,023,817 | A | * | 5/1977 | Lah et al. | 280/816 |
| 4,061,347 | A | * | 12/1977 | Stern et al. | 280/821 |
| 4,244,602 | A | * | 1/1981 | Allsop et al. | 280/821 |
| 5,114,186 | A | * | 5/1992 | Sugiyama | 280/821 |
| 5,484,361 | A | * | 1/1996 | Dunn | 482/51 |
| 5,720,474 | A | * | 2/1998 | Sugiyama | 267/249 |
| 5,855,363 | A | * | 1/1999 | Svendsen | 267/132 |
| 6,131,592 | A | * | 10/2000 | Panizza | 135/66 |
| 6,254,134 | B1 | * | 7/2001 | Panizza | 280/819 |
| 6,782,903 | B1 | * | 8/2004 | Jarman et al. | 135/75 |
| 7,025,072 | B2 | * | 4/2006 | McGrath | 135/75 |
| 7,395,829 | B2 | * | 7/2008 | Chapman | 135/82 |
| 7,434,592 | B2 | * | 10/2008 | Larson et al. | 135/73 |
| D600,002 | S | * | 9/2009 | Fulkerson | D3/8 |
| 7,611,449 | B2 | * | 11/2009 | Kim | 482/110 |
| 2002/0063369 | A1 | * | 5/2002 | Huang | 267/153 |
| 2005/0023816 | A1 | * | 2/2005 | Lenhart | 280/823 |
| 2007/0123399 | A1 | * | 5/2007 | Kim | 482/109 |

* cited by examiner

*Primary Examiner* — J. Allen Shriver, II
*Assistant Examiner* — Travis Coolman
(74) *Attorney, Agent, or Firm* — Baker & Associates PLLC; Trent H. Baker

(57) ABSTRACT

The present invention relates to systems and methods for damping the impact and rebound forces associated with the use of elongated poles. One embodiment of the present invention relates to a supportive pole system including an elongated shaft, hand receiving member, tip, and force absorbing system. The force absorbing system includes a damping member externally disposed on the elongated shaft between the elongated shaft and either the hand receiving member or the tip. The damping member includes an elastic material such as elastomer that rebounds in response to a compression force. The damping member may include a plurality of stages configured to include independent damping force response characteristics. The force absorbing system may further include a rebound air dampener within the hand receiving member for controlling the rebound force characteristics of the damping member.

17 Claims, 7 Drawing Sheets

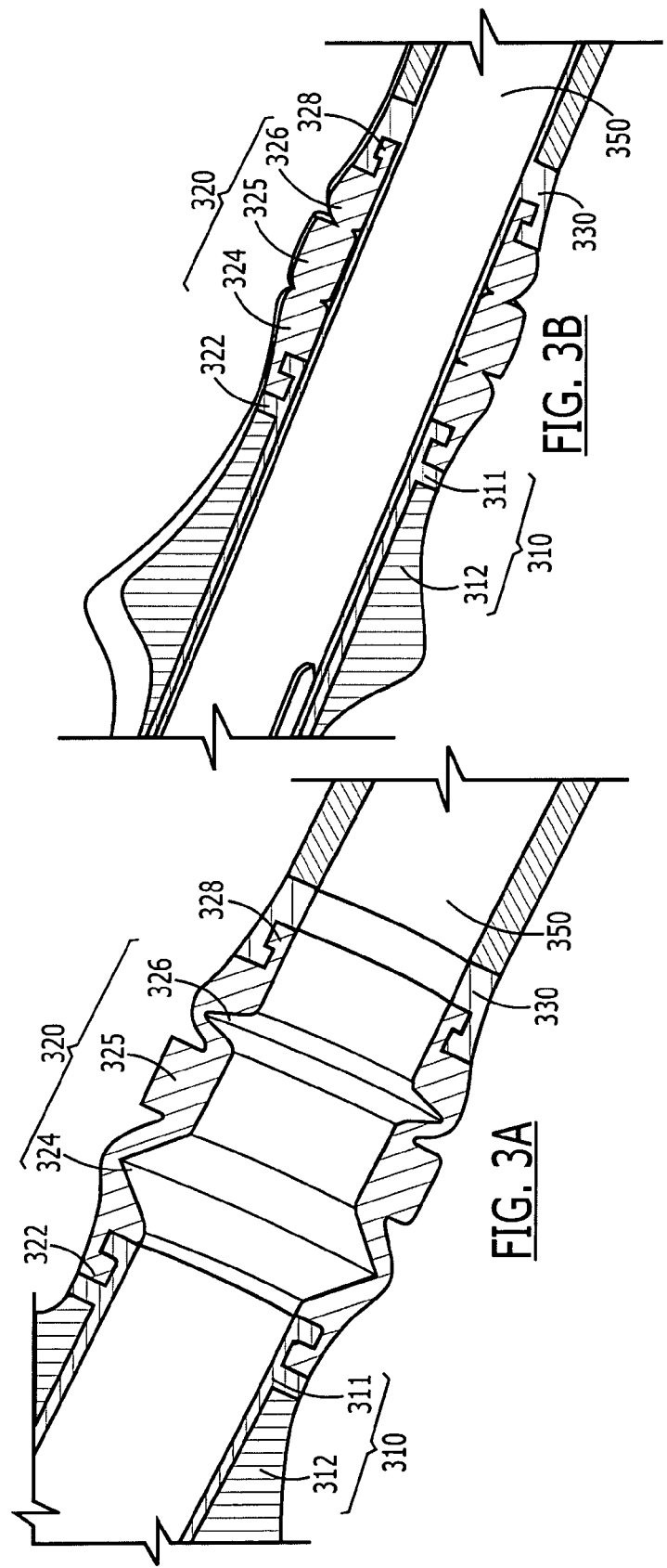

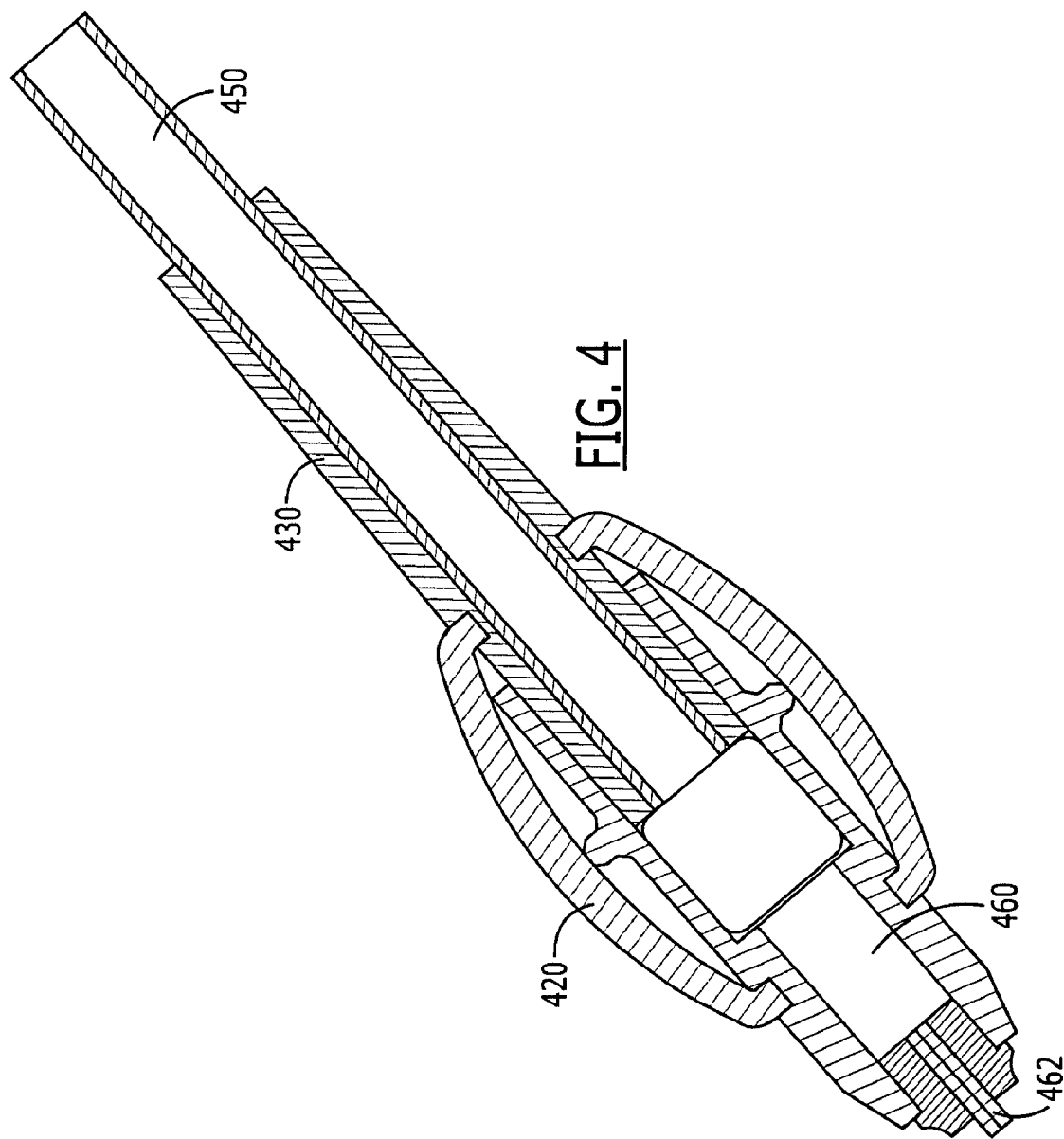

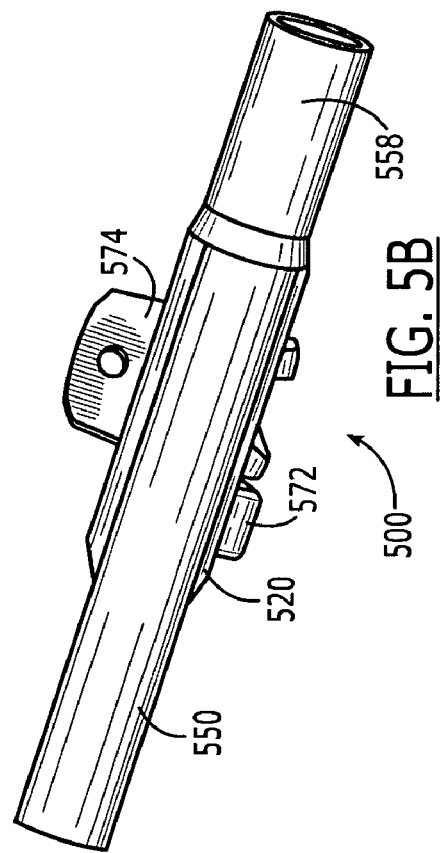
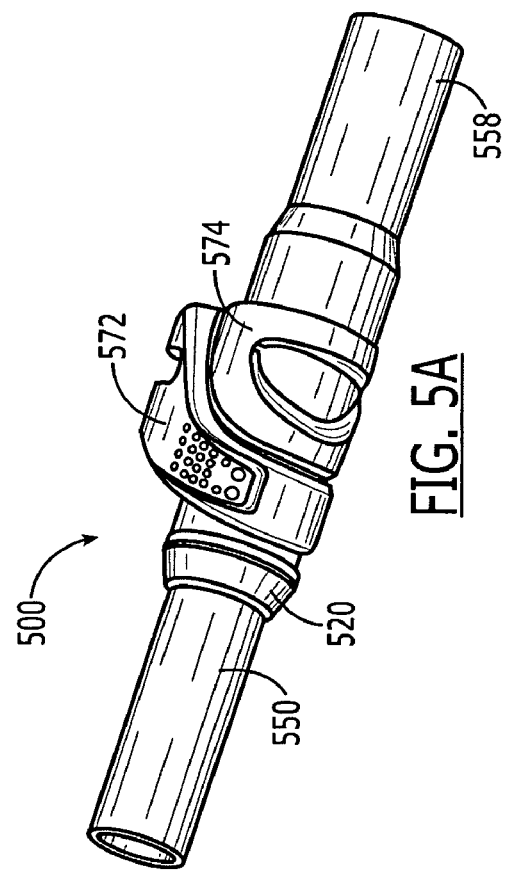

SYSTEMS AND METHODS FOR POLE IMPACT FORCE DAMPING

RELATED APPLICATIONS

This application claims priority to U.S. provisional application Ser. No. 60/866,417 filed Nov. 18, 2006, the contents of which are incorporated by reference.

FIELD OF THE INVENTION

The invention generally relates to force damping on elongated poles. In particular, the invention relates to systems and methods for damping the impact and rebound forces associated with the use of elongated poles.

BACKGROUND OF THE INVENTION

Poles are used for a variety of activities including skiing, trekking, hiking, snowshoeing, etc. The term ski pole is used interchangeably to refer to a pole that may be used for any purpose. Poles provide support for a user during particular activities. For example, hikers and trekkers commonly use poles to minimize knee impact by supporting a portion of their bodies' weight on the poles rather than their legs. Likewise, skiers use poles for intermittent support and assistance in particular types of turns. In addition, traditional cross-country skiers drive their poles downward to generate additional forward momentum. Poles are also used for various unconventional purposes such as supporting tents, marking accidents, operating a binding, etc.

Many conventional poles include a spring integrated into the pole to absorb or dampen impact forces during pole use. For example, each time a hiker positions a pole and transfers weight, various impact forces are transferred between the hiker, the pole, and the ground. Conventional spring mechanisms translate forces from either the user or the ground via the spring so as to dampen the resulting force. However, existing spring systems are unsatisfactory for a variety of reasons. First, conventional pole damping systems do not account for secondary forces such as rebound forces. Second, conventional pole damping systems have a progressive linear response that is not consistent with ideal force damping for supportive pole applications. Compression type springs create a damping force that is linearly related to how much the spring is compressed. Third, conventional pole damping systems are internal and therefore fail to provide any type of user confirmation of their operation or existence.

Therefore, there is a need in the industry for a pole damping system that overcomes the limitations of existing systems in a cost efficient manner.

SUMMARY OF THE INVENTION

The present invention relates to systems and methods for damping the impact and rebound forces associated with the use of elongated poles. One embodiment of the present invention relates to a supportive pole system including an elongated shaft, hand receiving member, tip, and force absorbing system. The hand receiving member is positioned on a lengthwise end of the shaft. The tip is positioned on a second lengthwise end of the elongated shaft. The force absorbing system includes a damping member externally disposed on the elongated shaft between the elongated shaft and either the hand receiving member or the tip. The damping member includes an elastic material such as elastomer that rebounds in response to a compression force. The damping member may include a plurality of stages configured to include independent damping force response characteristics. The force absorbing system may further include a rebound air dampener within the hand receiving member for controlling the rebound force characteristics of the damping member. A second embodiment of the present invention relates to a supportive pole system in which the damping member is disposed at a coupling point between two telescopically coupled segments of the elongated shaft. A third embodiment of the present invention relates to a multi-stage elastomer based force absorbing system for use in conjunction with an elongated supportive pole.

Embodiments of the present invention overcome the limitations of existing internal spring-based supportive pole damping systems. Elastomer materials are inherently lighter than steel and therefore can be used to produce damping systems that exhibit similar damping results while maintaining an overall lighter pole weight than that of steel spring-based systems. Embodiments of the present invention also include an externally visible damping system that provides visual feedback and assurance to a user of damping capability. In addition, elastomer based damping systems do not produce vibrations commonly associated with metal based damping systems. The optional inclusion of a rebound air damper further improves performance by enabling adjustment of the rebound force characteristics.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular-rather than complete-portions of the systems and methods of making and using the system according to the invention. In the Figures, the physical dimensions may be exaggerated for clarity.

FIGS. 3A and 3B illustrate detailed cross-sectional views of a multi-stage force absorbing system in an extended and compressed configuration in accordance with embodiments of the present invention;

FIG. 4 illustrates a perspective view of a bottom portion of a supportive pole system in accordance with embodiments of the present invention;

FIGS. 5A and 5B illustrate perspective and cross-sectional views of a portion of a supportive pole system including multiple telescopically coupled segments in accordance with embodiments of the present invention;

DETAILED DESCRIPTION OF THE INVENTION

The present invention relates to systems and methods for damping the impact and rebound forces associated with the use of elongated poles. One embodiment of the present invention relates to a supportive pole system including an elongated shaft, hand receiving member, tip, and force absorbing system. The hand receiving member is positioned on a lengthwise end of the shaft. The tip is positioned on a second lengthwise end of the elongated shaft. The force absorbing system includes a damping member externally disposed on the elongated shaft between the elongated shaft and either the hand receiving member or the tip. The damping member includes an elastic material such as elastomer that rebounds in response to a compression force. The damping member may include a plurality of stages configured to include independent damping force response characteristics. The force absorbing system may further include a rebound air dampener within the hand receiving member for controlling the rebound force characteristics of the damping member. A second embodiment of the present invention relates to a supportive pole system in which the damping member is disposed at a coupling point between two telescopically coupled segments of the elongated shaft. A third embodiment of the present invention relates to a multi-stage elastomer based force absorbing system for use in conjunction with an elongated supportive pole. While embodiments of present invention are described in reference to a supportive pole, it will be appreciated that the teachings of present invention are applicable to other areas.

The following terms are defined as follows:

Supportive pole—any type of elongated pole for purposes of supporting, balancing, or minimizing impact force upon a user during activities including but not limited to walking, hiking, skiing, etc. A supportive pole may include one or more elongated shaft segments.

Dampener or damping member—a system or component that absorbs forces such as a spring or a component composed of compliant/elastic rubber material. One example of a damping member is an elastomer dampener that elastically deforms in respond to a compression force and then geometrically rebounds once the compression force is removed or reduced. A damping member may further include one or more stages, which each include substantially independent damping response characteristics.

Rebound or response dampener—a system or component that absorbs, delays, or distributes rebound forces of a damping system so as to mitigate or slow the rebound forces distributed through a system. For example, a rebound dampener would absorb and incrementally release extension response forces of a compression spring after it has been compressed for purposes of damping.

Figure 1:
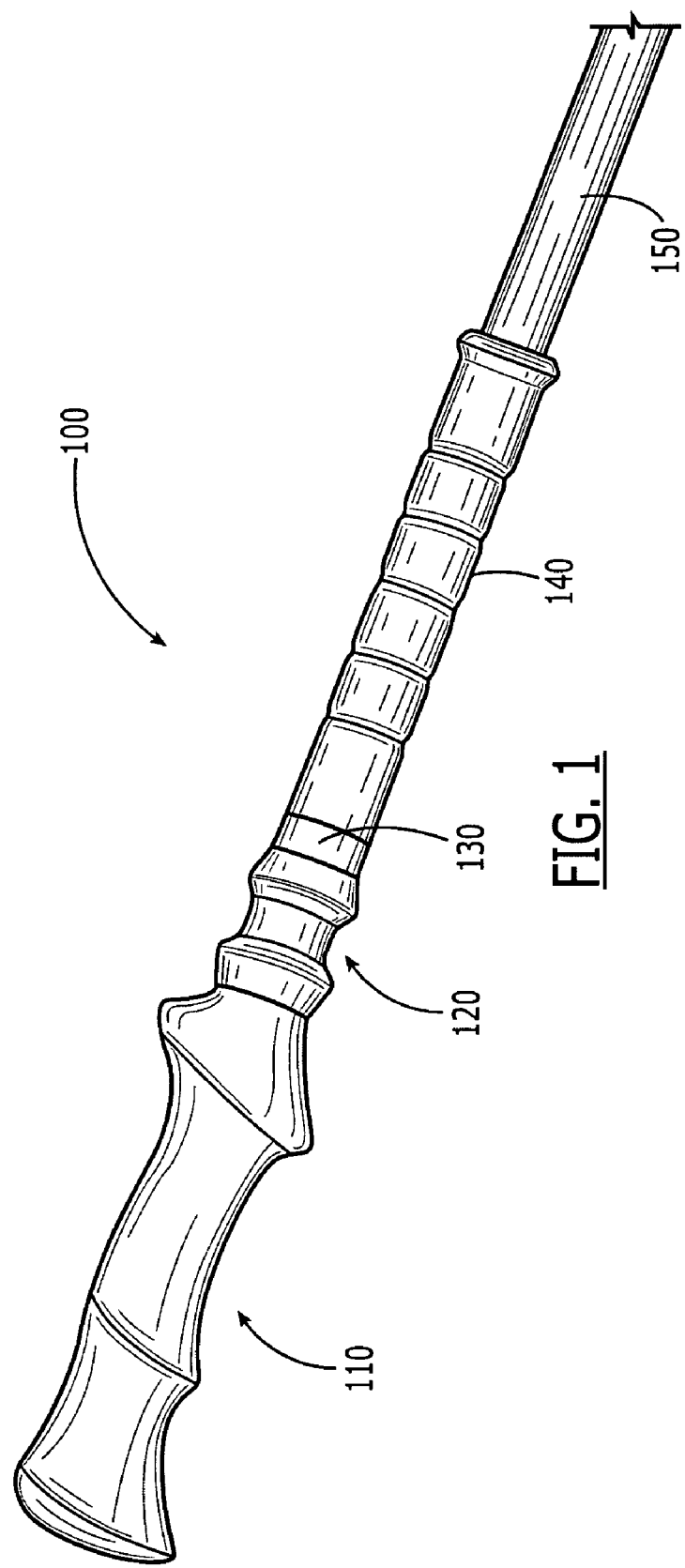
FIG. 1 illustrates a perspective view of a top portion of a supportive pole system in accordance with one embodiment of the present invention.

Reference is initially made to FIG. 1, which illustrates a perspective view of a top portion of a supportive pole system, designated generally at 100. The supportive pole system 100 includes a hand receiving member 110, a damping member 120, a collar 130, a lower grip 140, and an elongated shaft 150. Various other optional components may be added to the system without affecting the functionality. The hand receiving member 110 is commonly referred to as a handle and may include a grip, inner chamber, top, etc. The damping member 120 is part of a force absorbing system. The illustrated damping member 120 is an elastomer dampening element composed of an elastic material that is configured to dimensionally rebound in response to a compression force. The damping member 120 includes various circumferential curvatures to affect the force response characteristics. Likewise, the damping member 120 may be composed of one or more independent materials that have a particular hardness's or durometer to effect the force response characteristics. The collar 130 is a tubular member positioned adjacent to the damping member 120. Likewise, the lower grip 140 is positioned adjacent to the collar 130. A portion of the elongated shaft 150 is illustrated below the lower grip. The elongate shaft 150 is comprised of a supporting composition to enable a user to distribute lengthwise supporting forces. Various elongated shaft compositions, features, functions and/or shaft, pole, or stick configurations may be used and remain consistent with the present invention. The elongated shaft 150 in the illustrated embodiment extends through the lower grip 140, collar 130, and damping member 120. Therefore, the damping member 120 is positioned externally with respect to the elongated shaft 150. The elongated shaft 150 may also extend within the hand receiving member 110 or be coupled via an inner lengthwise coupling member such as a post-type coupling. This configuration couples the components of the system 100 in the illustrated lengthwise configuration. It should be noted that a tip is disposed on the opposite lengthwise end of the elongated shaft 150 with respect to the hand receiving member 110.

In operation, a user will engage the hand receiving member 110 and position the system 100 in a substantially upright configuration for purposes of support and/or balance. A portion of the user's gravitational weight is thereby transferred to the system 100 in the form of a force. The force is thereby transferred from the user to the system and opposed by the surface upon which the tip is placed, thereby causing a lengthwise compression force on the system 100. The damping member 120 will compress in a lengthwise manner to absorb the compression force. After the compression force is removed, the damping member will exert a lengthwise rebound force on the system 100. As discussed above and below, the particular composition and geometrical lengthwise radial shape of the damping member 120 will affect the way in which the damping member 120 both absorbs the compression force and rebounds once the force is removed. Likewise, various other components may be added to the force absorbing system to effect the response characteristics. These additional components may include but are not limited to a rebound air dampener, additional damping members, etc.

Figure 2:
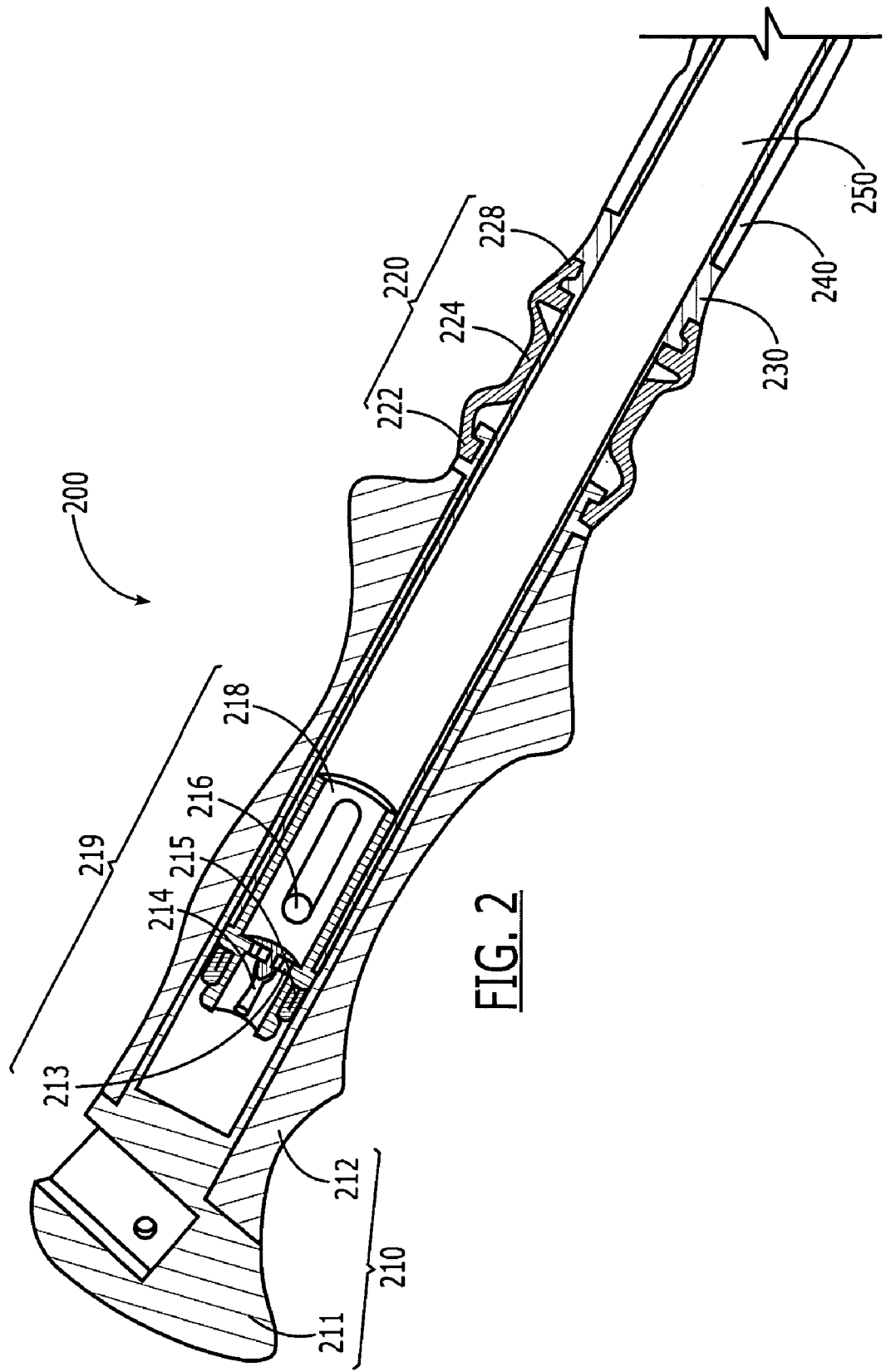
FIG. 2 illustrates a detailed cross-sectional view of a supportive pole system including a force absorbing system with a rebound air dampener in accordance with embodiments of the present invention.

Reference is next made to FIG. 2, which illustrates a detailed cross-sectional view of a supportive pole system including a force absorbing system with a rebound air dampener in accordance with embodiments of the present invention, designated generally at 200. The supportive pole system 200 includes a hand receiving member 210, a rebound air dampener or rebound system 219, a damping member 220, a collar 230, a lower grip 240, and an elongated shaft 250. The components are disposed in similar configuration to that illustrated and described above. The elongated shaft 250 in the illustrated embodiment is slidably engaged within that hand receiving member 210 rather than fixably engaged, as in FIG.

1. The hand receiving member 210 further includes a support structure 211 and a grip 212. The elongated shaft 250 extends within a channel in the support structure 211. The rebound air dampener 219 is coupled to the top lengthwise end portion of the elongated shaft 250. The rebound air dampener 219 and the damping member 220 are included in an overall force absorbing system of the illustrated supportive pole system 200 which may optionally further include additional components. The damping member 220 absorbs compression forces and generates a corresponding rebound force once the compression force is removed or reduced. The rebound air dampener 219 controls the effects of the rebound force generated by the damping member 200 onto the supportive pole system 200. The operation of the force absorbing system will be described in more detail below.

The illustrated rebound air dampener 219 includes a housing 218, a pin 216, an o-ring 215, a valve 214, and a set of holes 213. These components are disposed within the hand receiving member 210 and adjacent to a lengthwise end of the elongated shaft 250 to facilitate the rebound dampening in correspondence with the damping member 220. The housing 218 is shaped in a hollow tubular configuration including an internal housing chamber and air release port. The housing 218 fixably coupled to the lengthwise end of the support 211 of the hand receiving member 210 via the pin 216. The o-ring is positioned on the coupling region between the housing 218 and the support 211. The illustrated valve 214 is an umbrella valve disposed and oriented on the housing 218 as shown. The holes 213 are positioned below the cap of the umbrella valve on the housing 218 to facilitate the bleed out air functionality.

The damping member 220 further includes a curved region 224, a first lengthwise coupling 222, and a second lengthwise coupling 228. The damping member 220 is slidably coupled over the elongated shaft 220 via a hole or recess that extends lengthwise through the damping member 220 as shown. The position of the damping member 220 with respect to the hand receiving member 210 is fixed via the first and second lengthwise couplings 222, 228. The first lengthwise coupling 222 includes a keyed coupling between the damping member 220 and the support 211 of the hand receiving member 210. The second lengthwise coupling 228 includes a keyed coupling between the damping member 210 and the collar 230. These lengthwise couplings further prevent the damping member 220 from floating, inverting or translating away from hand receiving member, thereby affecting performance of the force absorbing system. The lengthwise couplings may also minimize transverse (non-lengthwise) deformation of the damping member 220.

In operation, the force absorbing system includes the damping member 220 compressing to absorb a compression force upon the supportive pole system 200. The compressing of the damping member 220 may cause the curved region 224 to bow outward or inward in various ways. In correspondence to the compression of the damping member 220, the elongated shaft 250 translates within the channel of the support 211 and the housing 218 of the rebound air dampener 219. The air within the housing 218 is forced down through the holes 213 below the umbrella valve 215 within an interior chamber, causing a vacuum to be formed within the chamber of the housing 218. A rebound expansion force is generated by the damping member 220 once the initial compression force on the system is removed or reduced. The rebound expansion force causes the elongated shaft 250 to translate lengthwise away from the hand receiving member 210. Because of the vacuum created within the chamber of the housing 218, pressurized air within the chamber is forced to bleed in through the valve 214 to allow the elongated shaft 250 to translate away from the hand receiving member 210. The valve 214 thereby slows and/or impedes the translation of the elongated shaft 250 effecting the rebound characteristics of the damping member 220 on the supportive pole system 200. Various parameters may be adjusted, including but not limited to the umbrella valve softness, the holes 213 location/volume, the housing 218 chamber volume, etc. Because of the described coupling and operational configuration, the rebound air dampener 219 is internally pressure coupled with the damping member 220. It will be appreciated that other mechanical coupling configurations may be utilized to create a similar pressure based rebound air dampener in accordance with embodiments of the present invention.

Reference is next made to FIGS. 3A and 3B, which illustrate detailed cross-sectional views of a multi-stage force absorbing system in an extended and compressed configuration, designated generally at 320. The system 320 includes a first lengthwise coupling 322, a first damping stage 324, a spacer region 325, a second damping stage 326, and a second lengthwise coupling 328. The illustrated system 320 is coupled with components of an elongated supportive pole system including a hand receiving member 310, a collar 330, and an elongated shaft 350. The hand receiving member 310 further includes a support 311 and a grip 312. The first and second lengthwise couplings 322, 328 reliably couple the damping member at a particular lengthwise location with respect to other components in a system. The benefits of a multi-stage force absorbing system over a convention single stage system are that specific damping and rebound characteristics can be associated with the individual stages. For example, one stage may correspond to high compression force absorption, while a different stage may correspond to low compression force absorption. Various undesirable outcomes such as a bottoming out or extreme rebounding may therefore be eliminated or mitigated with a multi-stage system. The geometry and composition of the first and second damping stage may be adjusted to provide the desired response characteristics. For example, in the illustrated embodiment, the first damping stage 324 includes a longer lengthwise compression travel curvature and is thereby configured to deform and/or absorb lower compression forces with respect to the second damping stage 326. The first and second damping stages include an externally curved circumferential region meaning that they each include a curvature extending radially around the circumference of the system 320. The geometry of the curvature affects the individual stage's compression/absorption response to a compression force. The spacer region 325 is disposed between the first and second damping stages 324, 326 to isolate the damping response characteristics. The spacer region 325 includes a substantially consistent radial thickness. The flat surface area of the spacer region 325 prevents deformation and thereby isolates the response characteristics of the first and second damping stages 324, 326. It is generally desirable for the damping member 320 to minimize transversal (non-lengthwise) deformation and prevent inverting or overlapping other components. Alternative multi-stage force absorbing system may include embodiments in which the individual stages are not coupled together and/or composed of different damping materials.

Reference is next made to FIG. 4, which illustrates a perspective view of a bottom portion of a supportive pole system in accordance with embodiments of the present invention, designated generally at 400. The system 400 includes an elongated shaft 450, a tip 462, a tip housing 460, a tip collar 430, and the damping member 420 The damping member 420 is coupled lengthwise to both the collar 430 and the tip housing 460 so as to be lengthwise fixed with respect to the tip 462. The elongated shaft 450 is slidably coupled within the tip housing 460. Therefore, as compression forces are exerted between the tip 462 and the elongated shaft 450, the elongated shaft 450 is configured to translate within the tip housing compressing the damping member 420. As described above, various force absorption characteristics may be adjusted according the geometry and composition of the damping member 420.

Reference is next made to FIGS. 5A and 5B, which illustrate perspective and cross-sectional views of a portion of a supportive pole system including multiple telescopically coupled segments, designated generally at 500. The illustrated system 500 includes a first segment 550, a second segment 558, a damping member 520, a first coupling mechanism 572, and a second coupling mechanism 574. The first and second segments 550, 558 are slidably or telescopically coupled to one another to facilitate adjustment and/or collapsibility. The segments 550, 558 are lengthwise coupled to include an overlap region. The illustrated overlap region includes a notch, the damping member 520, and the first and second coupling mechanisms 572, 574. The damping member 520 is radially coupled around the first segment 550 within the overlap region as illustrated in the cross-sectional FIG. 5B. This particular damping member 520 configuration is designed to primarily isolate vibrational forces between the segments 550, 558 rather than absorbing compression forces. Vibrational force isolation between telescopic segments thereby prevents vibrational forces from being translated throughout a supportive pole system. Various other coupling mechanisms and overlapping region configurations may be utilized.

Figure 6B:
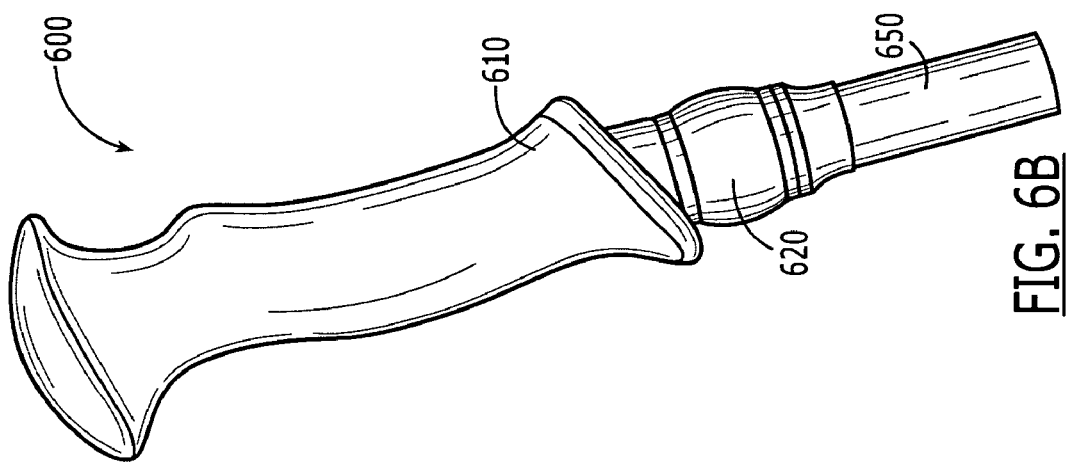
FIGS. 6A and 6B illustrate cross-sectional and perspective views of a top portion of a supportive pole system including a single-stage elastomer dampener disposed between a hand receiving member and a portion of the elongated shaft in accordance with embodiments of the present invention.
Figure 6A:
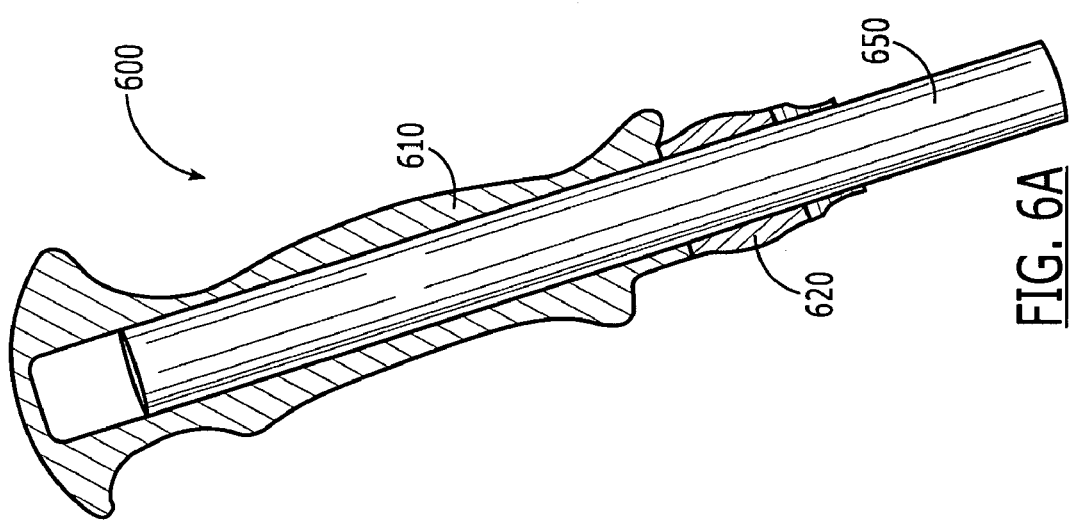

Reference is next made to FIGS. 6A and 6B, which illustrate cross-sectional and perspective views of a top portion of a supportive pole system including a single-stage elastomer dampener externally disposed between a hand receiving member and a portion of the elongated shaft, designated generally at 600. The system 600 includes a hand receiving member 610, a damping member 620, and an elongated shaft 650. The elongated shaft 650 is configured to translate within the hand receiving member 610 as illustrated in the cross-sectional view. Therefore, compression forces between the hand receiving member 610 and the elongated shaft 650 may be dampened by the damping member 620.

Figure 7B:
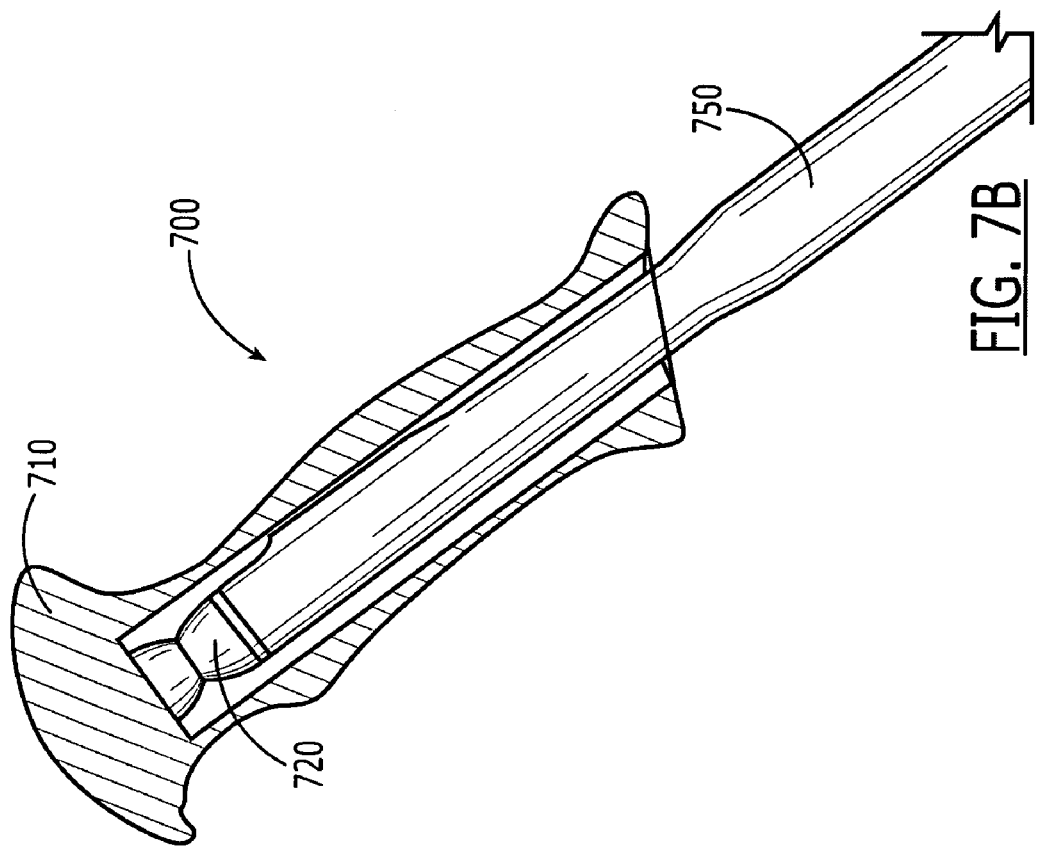
FIGS. 7A and 7B illustrate a perspective and cross-sectional views of a top portion of a supportive pole of a supportive pole system including a single-stage elastomer dampener alternatively disposed between a hand receiving member and a portion of the elongated shaft in accordance with embodiments of the present invention.
Figure 7A:
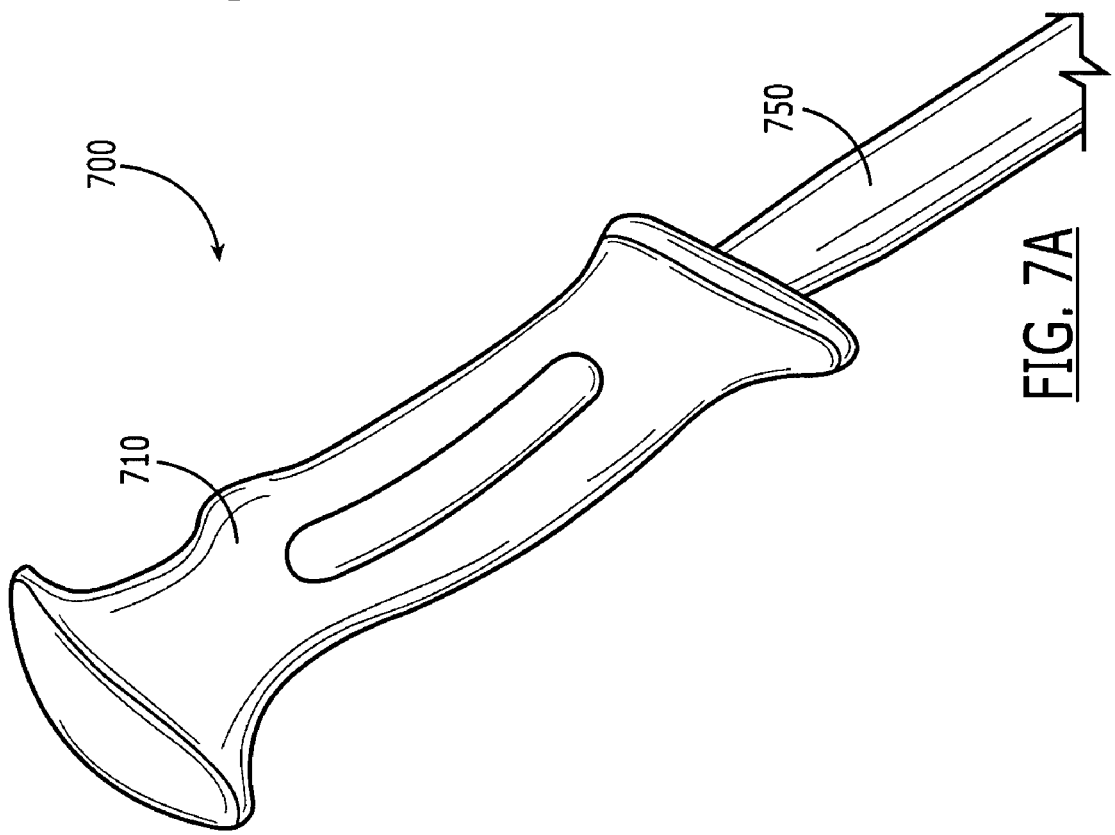

Reference is next made to FIGS. 7A and 7B, which illustrate a perspective and cross-sectional views of a top portion of a supportive pole system including a single-stage elastomer dampener alternatively disposed internally between a hand receiving member and a portion of the elongated shaft, designated generally at 700. The system 700 includes a hand receiving member 710, a damping member 720, and an elongated shaft 750. The elongated shaft 750 is configured to translate within the hand receiving member 710 as illustrated in the cross-sectional view. Therefore, compression forces between the hand receiving member 710 and the elongated shaft 750 may be dampened by the damping member 720.

Various other embodiments have been contemplated, including combinations in whole or in part of the embodiments described above.

What is claimed is:
1. A supportive pole system comprising:
an elongated shaft;
a hand receiving member disposed on a first lengthwise end of the elongated shaft;
a tip disposed on a second lengthwise end of the elongated shaft; and
a force absorbing system disposed between the elongated shaft and one of the hand receiving member and the tip, wherein the force absorbing system includes a damping member externally disposed with respect to the elongated shaft and includes an elastic material configured to dimensionally rebound in response to a compression force oriented substantially parallel to the lengthwise axis of the elongated shaft, and wherein the force absorbing system further includes a rebound air dampener substantially enclosed within the hand receiving member and configured to operate in conjunction with the damping member to slow a dimensional rebound response time of the damping member, and wherein the rebound air dampener is configured to resist a dimensional rebound force of the damping member upon the elongated shaft and substantially not resist the compression force exerted by the elongated shaft upon the damping member.

2. The supportive pole system of claim 1, wherein the damping member includes an elastomer dampener.

3. The supportive pole system of claim 2, wherein the elastomer dampener includes a plurality of stages that include independent damping force response characteristics.

4. The supportive pole system of claim 3, wherein the elastomer dampener includes a spacer region between each of the stages.

5. The supportive pole system of claim 3, wherein each of the plurality of stages include an externally curved circumferential region configured to lengthwise compress and radially expand in response to a compression force and rebound with a rebound force and within a rebound time corresponding to the shape of the externally curved circumferential region.

6. The supportive pole system of claim 1, wherein the elastomer dampener is cross-sectionally shaped to substantially match the cross-sectional shape of the elongated shaft.

7. The supportive pole system of claim 1, wherein the rebound air dampener includes an umbrella valve and hole configured to exert substantially less airflow resistance in a first direction versus a second direction.

8. The supportive pole system of claim 1, wherein the rebound air dampener includes a valve internally disposed within the hand receiving member and internally pressure coupled with the damping member via the elongated shaft.

9. The supportive pole system of claim 1, wherein the elongated shaft includes a plurality of telescopically coupled segments.

10. The supportive pole system of claim 1, wherein the damping member is coupled over the elongated shaft and adjacent to a collar, wherein the collar is coupled over the elongated shaft at a fixed lengthwise location.

11. The supportive pole system of claim 1, wherein the damping member is lengthwise coupled to the elongated shaft and one of the hand receiving member and the tip.

12. A supportive pole system comprising:
an elongated shaft including a plurality of telescopically coupled segments;
a hand receiving member disposed on a first lengthwise end of the elongated shaft;
a tip disposed on a second lengthwise end of the elongated shaft; and
a force absorbing system disposed within the lengthwise dimensions of the elongated shaft, hand receiving member, and tip, wherein the force absorbing system includes a damping member externally disposed with respect to the elongated shaft and includes an elastic material configured to dimensionally rebound in response to a compression force oriented substantially parallel to the lengthwise axis of the elongated shaft, and wherein the force absorbing system further includes a rebound air dampener substantially enclosed within the hand receiving member and configured to operate in conjunction with the damping member to slow a dimensional rebound response time of the damping member, and wherein the rebound air dampener is configured to resist a dimensional rebound force of the damping member upon the elongated shaft and substantially not resist the compression force exerted by the elongated shaft upon the damping member.

13. The supportive pole system of claim 12, wherein the rebound air dampener includes an umbrella valve and hole configured to exert substantially less airflow resistance in a first direction versus a second direction.

14. A multi-stage elastomer based force absorbing system for use in conjunction with an elongated supportive pole comprising:
   wherein the force absorbing system is disposed between an elongated shaft and one of a hand receiving member and a tip of the elongated supportive pole;
   a first damping stage including an externally disposed first externally curved circumferential region;
   a second damping stage region including an externally disposed second externally curved circumferential region;
   a spacer region disposed between the first and second damping stage regions;
   a coupling system configured to lengthwise engage with an elongated pole;
   a rebound air dampener substantially enclosed within the hand receiving member and configured to operate in conjunction with the damping member to slow a dimensional rebound response time of the damping member, and wherein the rebound air dampener is configured to resist a dimensional rebound force of the damping member upon the elongated shaft and substantially not resist the compression force exerted by the elongated shaft upon the damping member.

15. The supportive pole of claim 14, wherein the first and second externally curved circumferential regions include a lengthwise region across which a radial thickness changes.

16. The supportive pole of claim 14, wherein the spacer region is a lengthwise protruding region of substantially constant radial thickness.

17. The supportive pole of claim 14, wherein the coupling system includes a hole extending lengthwise through the first damping stage, second damping stage, and spacer region.

* * * * *